T. F. McCALLISTER.
POWER TRANSMISSION AND DRIVING MECHANISM FOR AUTOMOBILES.
APPLICATION FILED FEB. 27, 1917.
1,240,069.
Patented Sept. 11, 1917.
2 SHEETS—SHEET 1.
Fig. 1.
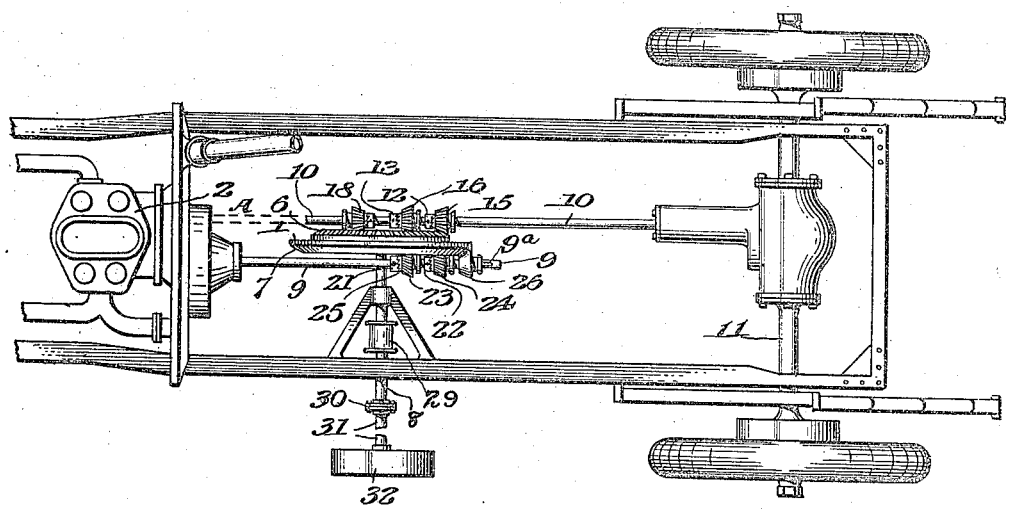
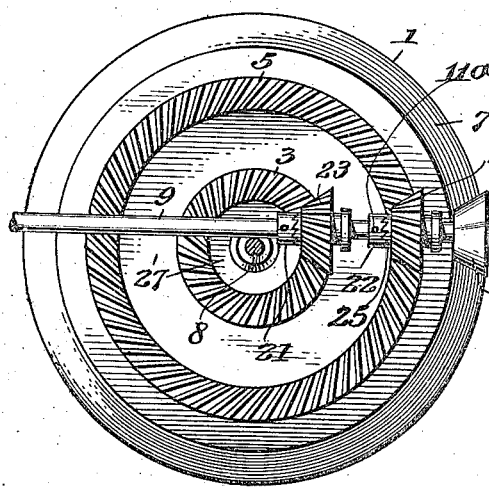
Fig. 2.
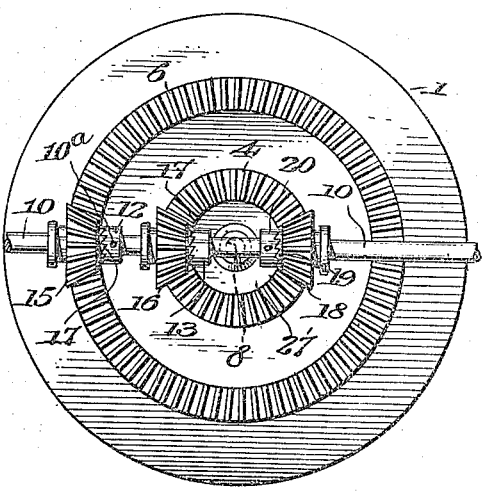
Fig. 3.
Inventor:
Thomas F. McCallister,
By C. T. Bell, Atty.

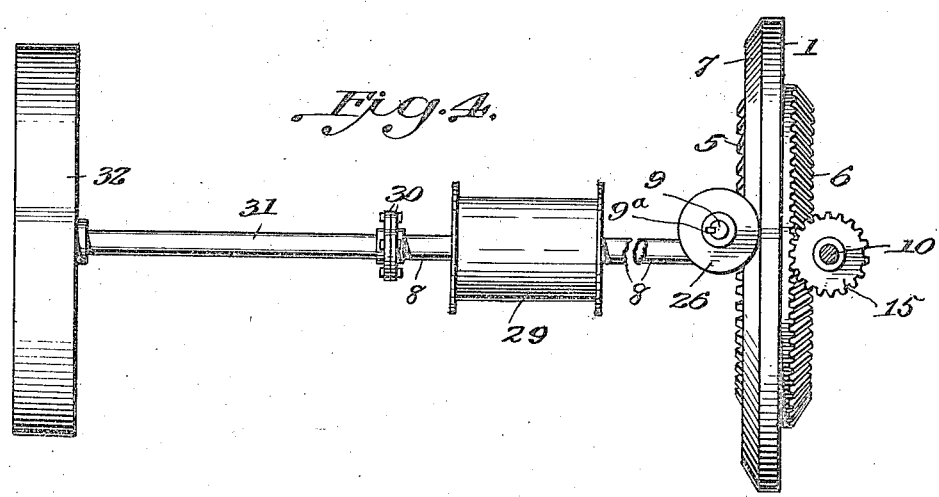
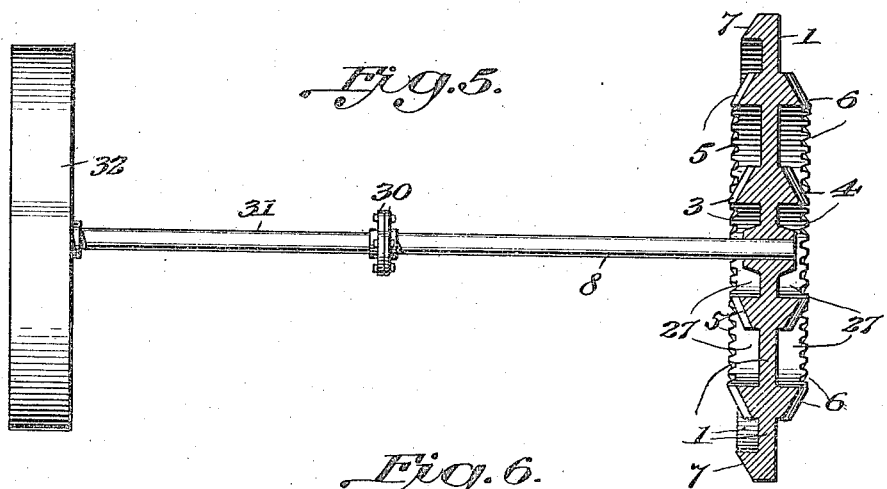
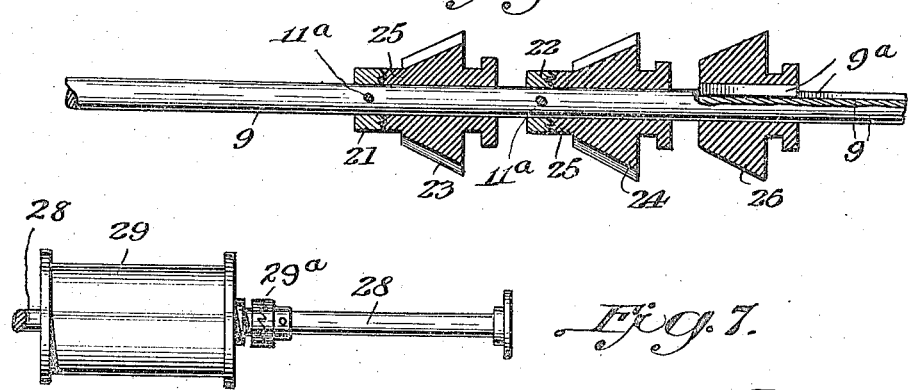

UNITED STATES PATENT OFFICE.

THOMAS F. McCALLISTER, OF PRINEVILLE, OREGON.

POWER-TRANSMISSION AND DRIVING MECHANISM FOR AUTOMOBILES.

1,240,069.　　　　　Specification of Letters Patent.　　Patented Sept. 11, 1917.

Application filed February 27, 1917.　Serial No. 151,277.

*To all whom it may concern:*

Be it known that I, THOMAS F. McCALLISTER, a citizen of the United States, residing at Prineville, in the county of Crook and State of Oregon, have invented certain new and useful Improvements in Power-Transmission and Driving Mechanism for Automobiles, of which the following is a specification.

This invention relates to automobile gearing, and pertains especially to power transmission gearing involving a combination of frictional and gear wheels for shifting and transmitting the driving power of automobiles.

The object of the invention is to provide an improved combination and arrangement of frictional and gear wheels or pinions mounted on a pair of independent shafts and coöperating with a drive wheel having frictional and toothed faces, for transmitting power.

A further object of the invention is to provide a motor vehicle with means for moving the wheels with its own power from stalled position, such means comprising a shaft driven by the motor or engine of the vehicle, and a drum or windlass mounted on and operated by said shaft in connection with a chain or rope having one end fixed or anchored and the other end attached to the drum or cable.

A still further object of the invention is to provide a motor vehicle with a supplemental shaft adapted to be coupled with the motor or engine shaft and having a belt pulley for operating various machines, such as sawing, threshing, pumping, &c.

A still further object of the invention is to provide a motor vehicle with special power transmission mechanism for propelling the vehicle at various speeds, for reversing, for derrick or stalled purposes, and for operating various machines by supplemental shaft, pulley, and belt connections with the propelling mechanism of the motor vehicle, and to furnish novel and peculiar means for shifting said mechanism so that the motor power may be transmitted and used for various purposes, as will be hereinafter fully explained.

A still further object of the invention is to provide for the location of the transmitting mechanism adjacent to the rear end of the engine, and to have a supplemental drive shaft extend from and at right angles to the said mechanism for the purpose of utilizing said shaft for operating a drum or windlass, or for operating a belt pulley.

In the accompanying drawings forming part of this application:—

Figure 1 is a top view of part of an automobile showing the application of the invention, the dotted lines A indicating the shaft extension to the front wheels.

Fig. 2 is an elevation looking at one side of the transmission mechanism.

Fig. 3 is a similar view looking at the other side of the transmission mechanism.

Fig. 4 is a detail end view of the transmitting mechanism.

Fig. 5 is a sectional view of the transmitting mechanism showing the supplemental shaft and belt pulley in elevation.

Fig. 6 is a detail section of the engine shaft with its pinions and clutches.

Fig. 7 is a detail elevation showing the drum or windlass mounted on a clutch shaft.

The same reference characters denote the same parts throughout the several views of the drawings.

In order to afford means for producing various speeds as desired, and for transmitting the driving power of the engine, I employ a multiple gear wheel 1, mounted adjacent to the engine 2. The wheel is of special construction, having an annular inner gear 3 on the engine shaft side thereof, a similar gear 4 on the other side of the wheel opposite the gear 3. The wheel is also provided on the engine shaft side with an outer gear 5, and the other side of the wheel has a similar outer gear 6 opposite the gear 5. The engine shaft side of the wheel is provided with an annular frictional or smooth face 7, off-set annularly from the gear 5 to the periphery of the wheel, so that the gear 5 is centrally between the frictional bearing face 7 and the gear 3, all of said gears being concentric.

I employ a pair of shafts, one on each side of the wheel 1, and extend said shafts across the faces of the wheel perpendicular to the wheel shaft 8. The primary shaft 9 of the pair of shafts is located just above the shaft 8, and constitutes the engine shaft. The other or auxiliary shaft 10, of said pair, constitutes a drive shaft which is geared with the rear axle 11 of an automobile. The shaft 10 has fixed thereto clutches 12 and 13, and driving pinions 15 and 16 are slidable on the shaft, and have a clutch-engaging face 17 coöperating with the clutches 12 and 13, for shifting the pinions with respect to the wheel gears 6 and 4 respectively, for various speeds. The shaft 10 has a reversing pinion 18 keyed to and slidable on the shaft, and is provided with a clutch member 19 coöperating with a clutch 20 secured to the shaft 10, for shifting the pinion 18 into and out of gear with the wheel gear 4, in reverse movement, said clutches are fixed at $10^a$ to the shaft 10.

The primary or engine shaft 9 has a pair of clutches 21 and 22 fixed thereto at $11^a$, and a pair of pinions 23 and 24 are slidable on the shaft 9 and have clutch-engaging faces 25. The pinion 23 meshes with the wheel gear 3, and the pinion 24 meshes with the wheel gear 5, so that the wheel 1 is revolved by the shaft 9 direct from the engine. For slow speed and in starting the machine, I provide the shaft 9 with a slidable friction pinion 26, which is keyed to the shaft at $9^a$, and which is made to engage the friction face 7 of the wheel 1, as desired or as occasion may demand. The sides of the wheel have annular cut outs 27 between the various gears or toothed portions of the wheel so as to permit sliding movement of the various pinions without interference.

It will be seen that one side of the wheel 1 coöperates with certain of the pinions of the shaft 10, for driving this shaft, that the other or opposite face of the wheel coöperates with certain of the pinions on the shaft 9 for driving or revolving the wheel, that the wheel may be driven or revolved in either direction as desired or as occasion may demand, by operating the reversing pinion, and that the other pinions are shifted with respect to the center of the wheel 1, for varying the speed of the machine. Another important function or purpose of the wheel 1, is to have it operate the shaft 8 upon which it is mounted, for operating certain other elements by means of the driving power imparted to the wheel from the engine of the machine. This I accomplish by extending the shaft 8 from one side of the wheel at right angles to the shaft 10, and under the shaft 9. The shaft 8 may revolve a drum or windlass 29 mounted thereon, or the windlass may be coupled by a clutch $29^a$ to the outer end of the shaft 28. Obviously the windlass and a rope or cable may be operated by the wheel 1, for moving a stalled automobile or truck, and for derrick or other such purposes. The shaft coupling 30 is such as to afford means for attaching a supplemental shaft 31, having a pulley 32 from driving a belt in operating various machines, especially such as usually require separate engines or motor power for farm and ranch work. Obviously a sprocket wheel may be substituted for the pulley in the event of using a sprocket chain. In operating these supplemental elements, the pinions of the shaft 10 are shifted out of gear with the wheel 1, and the engine shaft 9 drives the said wheel by reason of the gear pinions meshing with the wheel gears. The supplemental cross shaft 28 is suitably journaled on the frame of the machine or automobile so as to centralize the wheel 1 as near as possible with respect to the engine and the engine shaft 9. The driving shaft 10 parallels the shaft 9 on the opposite side of the wheel 1, and the latter is revolved centrally between the shafts 9 and 10, and preferably adjacent to the engine or motor of the automobile. Obviously this arrangement affords unusual power from the engine direct to the wheel 1, which is highly important for transmitting power to the cross shaft and its connections, and also to the rear and front axles of various motor vehicles.

It will be seen that the pinions of the shaft 9 mesh only with their respective gears on this side of the wheel 1, that the pinions on the shaft 10 mesh only with their respective gears on the other side of the said wheel, that all of the pinions being loose they may be shifted out of gear with the wheel 1, or only certain of the pinions on either or both of said shafts may be shifted without moving the remaining pinions, that a stalled truck or automobile may be moved by its own engine, and that such engine may be expeditiously utilized for driving a supplemental cross shaft to which may be applied various elements of power transmission. Obviously the invention is applicable to motor trucks and traction engines.

I do not wish to confine my invention to any particular size or material, nor do I wish to be understood as limiting the invention to any particular automobile or motor vehicle, or to the particular location of the parts, or to any particular connection of the supplemental power transmissions, but reserve the right to make such changes and variations therein and in the practical application of the invention as may come within the scope of the appended claims.

Having thus described my invention what I claim as new and desire to secure by Letters Patent is:—

1. In transmission driving mechanism for motor vehicles, a wheel having companion concentric multiple gears on each side thereof, a primary shaft extending across one side of the wheel, an auxiliary shaft parallel with the primary shaft and extending across the other side of the wheel, pinions slidable on the primary shaft for each of the gears on one side of the wheel, pinions slidable on the auxiliary shaft for each of the gears on the other side of the wheel, a clutch face on each pinion, and clutches secured to the shafts and engaging said faces for locking the pinions to the shafts.

2. In transmission driving mechanism for motor vehicles, a wheel having companion concentric multiple gears on each side thereof, a primary shaft extending across one side of the wheel, an auxiliary shaft parallel with the primary shaft and extending across the other side of the wheel, pinions slidable on the primary shaft for each of the gears on one side of the wheel, pinions slidable on the auxiliary shaft for each of the gears on the other side of the wheel, means secured to the shafts for coupling the pinions with said shafts, a shaft upon which the wheel is mounted and extending perpendicular to the said shafts for operating supplemental driving devices.

3. In transmission driving mechanism for motor vehicles, a pair of parallel shafts, loose pinions on each shaft opposite each other, one of said shafts constituting the primary shaft, a wheel revoluble between the shafts and having independent gears for each of said pinions, a shaft upon which the wheel is mounted and extending under and at right angles to the primary shaft for operating supplemental driving devices, and means secured to the shafts for coupling the pinions with their shafts.

4. In transmission driving mechanism for motor vehicles, a multiple speed and reversing wheel comprising a plurality of concentric gears on each side of the wheel, an annular frictional face on one side of and adjacent to the periphery of the wheel, a pair of shafts which straddle the wheel, a frictional pinion slidable on one of said shafts for engaging said face, a pair of pinions slidable on this shaft for meshing with one pair of the wheel gears, a pair of pinions slidable on the other shaft and meshing with one gear on the other side of the wheel, a pinion slidable on this shaft for meshing with the other gear on the same side of the wheel, and means for coupling all of said pinions with their respective shafts.

5. In transmission driving mechanism for motor vehicles, a multiple speed and reversing wheel comprising a plurality of concentric gears on each side of the wheel, a pair of shafts which straddle the wheel, a pair of pinions slidable on one of the shafts and meshing with a pair of wheel gears, a pair of pinions slidable on the other shaft and meshing with the same gear on the opposite side of the wheel, a pinion slidable on this shaft for meshing with the other wheel gear on the same side of the wheel, a shaft upon which the wheel is secured and extending from the wheel at right angles to the said shafts, a pulley shaft coupled with the wheel shaft, and means for coupling all of said pinions with their respective shafts.

6. In transmission driving mechanism for motor vehicles, a multiple speed and reversing wheel comprising a plurality of concentric gears on each side of the wheel, a pair of shafts which straddle the wheel, a pair of pinions slidable on one of the shafts and meshing with a pair of wheel gears, a pair of pinions slidable on the other shaft for meshing with the same gear on the opposite side of the wheel, a pinion slidable on this shaft for meshing with the other wheel gear on the same side of the wheel, a shaft upon which the wheel is secured and extending from the wheel at right angles to the said shafts, a cable operating means mounted on the wheel shaft, and means for coupling all of said pinions with their respective shafts.

7. In transmission driving mechanism for motor vehicles, a multiple speed and reversing wheel having a pair of concentric gears on one side thereof and constituting the driven side of the wheel, a pair of concentric gears on the other side of the wheel opposite the other pair of gears and constituting the driving face of the wheel, a pair of shafts which straddle the wheel, a pair of pinions on the driven shaft of said shafts and meshing with the driven gears, a pair of pinions on the driving shaft of said pair of shafts and meshing with the inner gear of said pair of driving gears, a pinion on the driving shaft and meshing with the outer gear of the driving gears, a frictional gear on the driven face adjacent to the periphery of the wheel, a frictional pinion on the driven shaft and engaging the frictional gear, a shaft upon which the wheel is secured and extending at right angles to the said pair of shafts and terminating in a shaft coupling, and means for changing the position of the pinions relative to the wheel gears.

In witness whereof I hereunto set my hand in the presence of two witnesses.

THOMAS F. McCALLISTER.

Witnesses:
GUY E. DOBSON,
E. H. KURTZ.

Copies of this patent may be obtained for five cents each, by addressing the "Commissioner of Patents, Washington, D. C."